Feb. 3, 1970     R. V. MATHERS ET AL     3,493,222
SPRING SUSPENSION
Filed Oct. 30, 1967
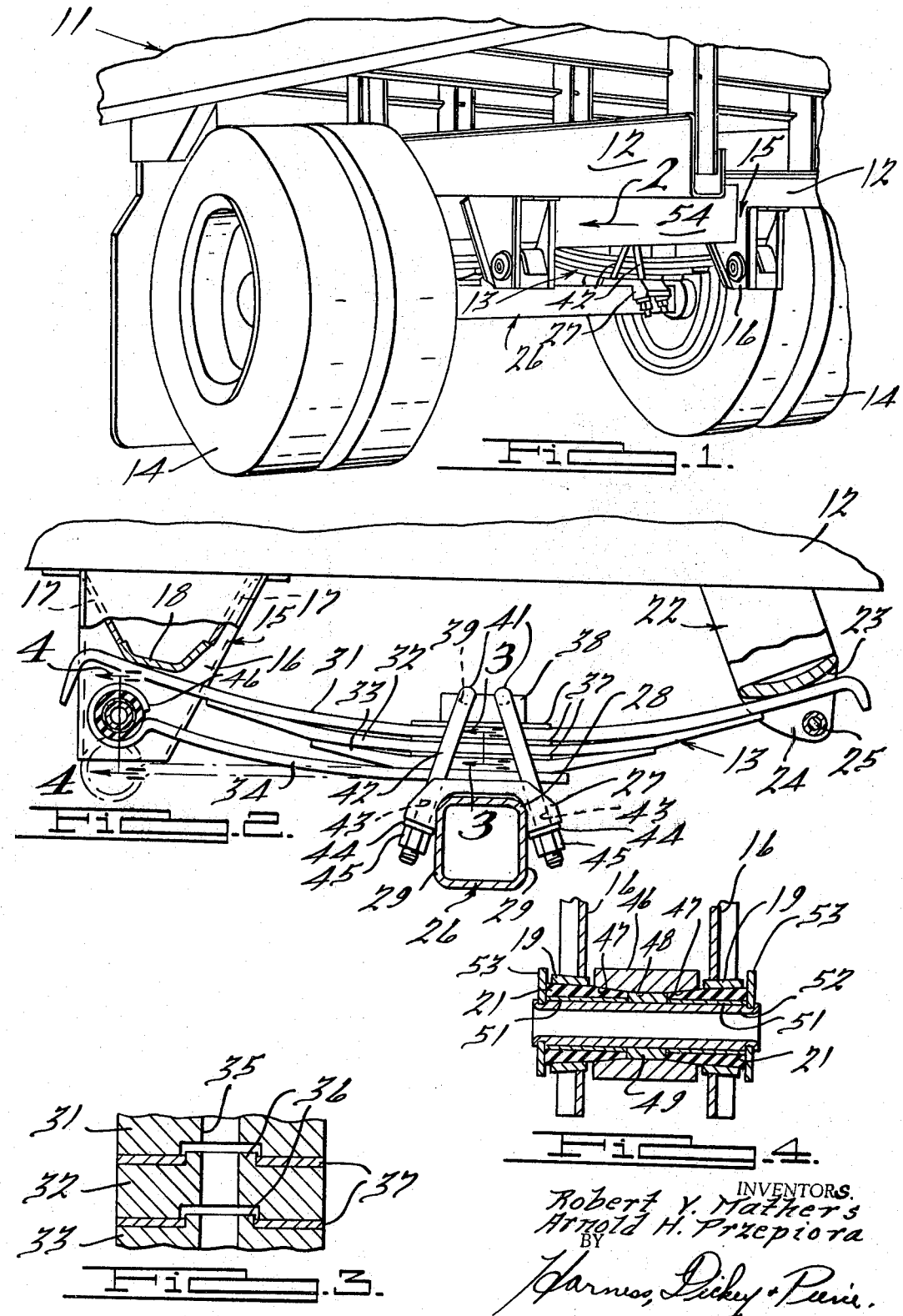
INVENTORS.
Robert V. Mathers
Arnold H. Przepiora
BY
Harness, Dickey & Pierce.
ATTORNEYS.

United States Patent Office 3,493,222
Patented Feb. 3, 1970

3,493,222
SPRING SUSPENSION
Robert V. Mathers, Grosse Pointe Farms, and Arnold H. Przepiora, Detroit, Mich., assignors to Fruehauf Corporation, Detroit, Mich., a corporation of Michigan
Filed Oct. 30, 1967, Ser. No. 678,942
Int. Cl. B60g *11/02;* F16f *1/18*
U.S. Cl. 267—54        12 Claims

ABSTRACT OF THE DISCLOSURE

A plurality of leaf springs are secured together near their center and to one end of a leaf spring having a wrapped eye at the free end which is sprung into position in a hanger and secured by rubber bushings therein. The wrapped eye leaf spring reduces wear, shock and maintenance and carries the fore and aft loads while providing greater lateral stability to the load. The tapered leaf springs are constant stress beams and the multiple assembly functions as a thick tapered beam in place of stepped series of plates usually provided. Delrin liners between the leaves reduces interleaf friction, increases the life and the need for additional springs to satisfy light and heavy duty applications.

BACKGROUND OF THE INVENTION

Multiple sets of stepped leaf springs have been employed heretofore with radius rods for supporting vehicle bodies. The leaf springs of the present invention has the leaves tapered at the ends and spaced by Delrin pads and stabilized by the wrapped-eye leaf spring which is preloaded and is believed to substantially advance the art of leaf spring suspensions.

SUMMARY OF THE INVENTION

A square axle has a seat on the top on which the tapered leaf springs are secured by oppositely sloping U-bolts engaging a saddle at the top which clamp the springs together and on the seat. The wrapped-eye leaf spring has the free end portion clamped against the seat and the eye end portion extended forwardly in a substantial horizontal position. The eye is forced upwardly and secured to the forward hanger in elestomeric bushings to prestress the leaf spring portion. The leaf springs are tapered at the ends to provide constant stress beams with the longer top leaf spring having its ends bent downwardly with the adjacent portions engaged by hard steel surfaces on the trailer body which offer excellent wear resistance. The center of the leaf springs and the free end of the eye leaf spring have aligned apertures therethrough with offset portions thereabout which interlock with each other and prevent the leaves from relatively moving transverse and lengthwise of each other. Delrin liners at the center of the leaf springs permit the leaves to come in contact with each other only at the ends which reduces interleaf friction and thereby improves the ride characteristics since the leaves can react in a faster manner. The eye leaf spring performs the same function as a radius rod and adds resiliency to the assembly.

BRIEF DESCRIPTION OF THE DRAWING

FIGURE 1 is a broken front view of a trailer having a spring assembly between the wheel axle and frame embodying features of the present invention;

FIG. 2 is a side view of the spring assembly illustrated in FIG. 1, as viewed from the point 2 thereof;

FIG. 3 is an enlarged broken sectional view of the structure illustrated in FIG. 2, taken on the line 3—3 thereof, and FIG. 4 is an enlarged broken sectional view of the structure illustrated in FIG. 2, taken on the line 4—4 thereof.

DESCRIPTION OF THE PREFERRED EMBODIMENT

A trailer body 11 is illustrated in FIG. 1 having side rails 12 supported by spring units 13 for an axle 26 having wheels 14 on the ends thereof. A forward hanger 15 is welded to the bottom web of each of the rails 12 and are constructed from a pair of flanged side plates 16 spaced by a pair of plates 17 and a central wear plate 18 of heat treated high strength steel. Below the wear plate 18 the plates 16 have aligned tapered sleeves 19 welded thereto for supporting specially compounded flexible elastomeric bushings 21. Rear hangers 22 are secured to the rails 12 rearwardly of the front hangers 15 having a heat treated cast steel web 23, which is wear resistant. From the web 23, a pair of ears 24 extends downwardly to confine the top leaf spring end and retained therebetween by a bolt 25 which extends through apertures in the end of the ears.

The wheels 14 are supported at the ends of the square an axle made of a cylindrical tube. A seat 27 for the leaf axle 26 which provides substantially more strength than springs is welded to the top of the axle inwardly from each end thereof to provide clearance below the axle throughout its length. The seat engages the top corners 28 of the axle and provides radial force thereat downwardly through the side walls 29 to provide uniform loading of the axle.

A leaf spring assembly 30 has a top leaf spring 31, an intermediate leaf spring 32 and a bottom leaf spring 33 along with a wrapped-eye leaf spring 34. The leaf springs 31, 32 and 33 at their center and the wrapped eye leaf spring 34 at the free end have an aperture 35 therethrough and offset portions 36 thereabout. The offset portions 36 provide shoulders for Delrin spacer pads 37 located between the leaf springs 31, 32, and 33 and on the top of the main leaf spring 31. The offset portions 36 prevent the leaf springs from shifting longitudinally and laterally of each other when clamped together. A forged steel saddle 38 has contoured recesses which are engaged by a pair of U-bolts 41, legs 42 of which extend through apertures 43 in the seat 27. The ends of the legs are threaded and have washers 44 and nuts 45 screwed thereon to tightly clamp the saddle 38, pads 37 and the leaf springs 31, 32, 33 and the wrapped-eye leaf spring 34 in fixed relation to each other and to the top of the seat 27.

The upper ends of the U-bolts 41 slope toward each other and when the leaf spring assembly 30 is supported in the hangers 15 and 22, a wrapped-eye 46 on the end of the leaf spring 34 extends below the tapered sleeves 19 with the leaf spring portion in substantially horizontal position as illustrated in dot and dash line. This requires the wrapped-eye to be forced upwardly into alignment with the sleeves 19 to prestress the leaf spring portion thereof. The eye 46 has tapered surfaces 47 extending inwardly from each end to a central cylindrical surface 48. A cylindrical sleeve 49 is disposed in the wrapped-eye 46 in engagement with the central cylindrical portion 48 thereof. The two bushings 21 are lubricated and immediately inserted through each of the tapered sleeves 19 and into the tapered surfaces 47 of the eye 46, as clearly illustrated in FIG. 4. The bushings are secured to cylindrical sleeves 51 which are moved into engagement with the central cylindrical sleeve 49. It is to be understood that a headed bolt could draw the two bushings 21 together when a nut and washer is applied to the threaded end.

A sleeve 52 is herein illustrated extending through the sleeves 49 and 51 having the end walls reduced in thickness and flanged over end washers 53 after the sleeves 49 and 51 have been moved into abutting relation with each other. The mounting of the wrapped-eye 46 of the leaf spring 34 in this manner eliminates wear, reduces shock and maintenance and functions as a radius rod for reducing torque and controlling the fore and aft loading of the axle. A spacer plate 54 is welded between the inner surface of the rails 12 and the inner plates 16 of the forward hangers 15 to provide strength and stability thereto.

The leaf springs are made from chrome-bearing alloy steel and after being cut to length and tapered at each end, the main spring 31 has its end bent downwardly substantially at right angles. The central holes and offset portions are added after which the leaf springs are quenched and tempered to 388 to 444 Brinnel hardness which provides a tensile strength of approximately 200,000 p.s.i. The taper on each leaf spring 31, 32 and 33 simulates a constant stress beam and the three leaves provides a thick tapered beam with the end portions of the leaf springs 32 and 33 directly engaging the leaf spring adjacent thereto. The leaf spring 31 has extra length with the hook ends for limiting the rebound travel and provides maximum retention of the springs in the hangers. The bolt 25 inserted in the downward extending ears 24 of the hanger 22 prevent the spring from moving downwardly any substantial degree from the web 23. After the leaf springs 31, 32, 33 and 34 have been formed, they are shot cleaned and immediately rust proofed. When the bushings 21 are to be assembled, they are dipped into a soap-water solution and immediately applied under pressure to have the elastomeric material disposed in firm fixed relation to the sloping surfaces 47 of the eye and the sloping inner surface of the tapered sleeves 19. Since the longitudinal loads are applied centrally of the main leaf spring, the tendency for the eye to open or unwrap is reduced. The Delrin liners at the centers of the leaf springs permit the springs to contact each other only at the ends to thereby reduce interleaf friction, and provide improved riding characteristics since the leaves are permitted to react faster.

What is claimed is:

1. In a spring suspension mounted between an axle and a body having rails, a front and rear hanger on opposite rails at the rear thereof, hard wear plates on said hangers, a main leaf spring having its ends engaged with said wear plates, and a wrapped-eye leaf spring secured to said axle with said first spring having the wrapped eye forceably moved upwardly into and secured to one of said hangers to prestress the leaf spring portion thereof.

2. In a spring suspension as recited in claim 1, wherein additional leaf springs are mounted between said main and wrapped-eye leaf springs having their ends in engagement with each other and said main leaf spring.

3. In a spring suspension as recited in claim 2, wherein said leaf springs have a central aperture with the metal thereabout offset to interlock the leaf springs relative to each other.

4. In a spring suspension as recited in claim 3, wherein pads of Delrin material have central apertures to receive the offset portions for spacing the central sections of the leaf springs to retain the sections out of contact with each other.

5. In a spring suspension as recited in claim 4, wherein the main and additional leaf springs are tapered outwardly from the center to simulate constant stressed beams.

6. In a spring suspension as recited in claim 1, wherein the wrapped eye is secured in the hangers on pressurized elastomeric bushings.

7. In a spring suspension as recited in claim 6, wherein the eye has a cylindrical center which tapers outwardly to the ends, and tapered sleeves on said one hanger which slopes toward the eye substantially in continuation of the taper at the eye ends.

8. In a spring suspension as recited in claim 7, wherein a cylindrical sleeve engages the cylindrical center of the eye, and a sleeve on the inner wall of each said bushings which abut the central cylindrical sleeve when in assembled relation in the eye.

9. In a spring suspension as recited in claim 8, wherein a tube extends through said bushing sleeves and the central cylindrical sleeve, and a washer on each end of the tube over which the tube ends are flanged to clamp the eye to said one housing.

10. In a spring suspension as recited in claim 3, wherein the axle is square in section, a spring seat on the top of the axle near each end thereof in engagement with the corners of the axle to have the load on the springs applied downwardly through the axle side walls.

11. In a spring suspension as recited in claim 10, wherein a recess saddle is applied to the top of a main leaf spring, and a pair of U-bolts registered with the recesses of the saddle and provide a clamping force to the saddle, springs, pads and seat.

12. In a spring suspension as recited in claim 11, wherein said U-bolts slope upwardly toward each other at the top so as to diverge outwardly of each other at the bottom.

References Cited

UNITED STATES PATENTS

| | | | |
|---|---|---|---|
| 3,281,139 | 10/1966 | Faherty | 267—47 |
| 3,365,190 | 1/1968 | Usalis | 267—54 |

JAMES B. MARBERT, Primary Examiner

U.S. Cl. X.R.

280—124